United States Patent [19]

Glen et al.

[11] Patent Number: 4,892,629
[45] Date of Patent: Jan. 9, 1990

[54] ELECTROCHEMICAL PREPARATION OF SILVER OXIDE ELECTRODES HAVING HIGH THERMAL STABILITY

[75] Inventors: Daniel R. Glen, Baltimore, Md.; Azzam N. Mansour, Fairfax Station, Va.; Kathleen M. O'Neill, Silver Spring, Md.; Steven Dallek, Beltsville, Md.; Benjamin F. Larrick, Silver Spring, Md.

[73] Assignee: The United States of America as represented by the Secretary of the Navy, Washington, D.C.

[21] Appl. No.: 389,219

[22] Filed: Aug. 2, 1989

[51] Int. Cl.⁴ .............................................. C25D 11/02
[52] U.S. Cl. .................................................... 204/56.1
[58] Field of Search ....................................... 204/56.1

[56] References Cited

U.S. PATENT DOCUMENTS 2,615,930  10/1952  Moulton .............................. 204/56.1

Primary Examiner—T. M. Tufariello
Attorney, Agent, or Firm—Kenneth E. Walden; Roger D. Johnson

[57] ABSTRACT

The shelf life of electrochemically prepared AgO cathodes is improved by increasing the temperature of anodization step to about 70° C. or higher. At these elevated temperatures the capacity of the AgO electrode can also be increased by using a charge-discharge-charge regime.

7 Claims, 2 Drawing Sheets

ELECTROCHEMICAL PREPARATION OF SILVER OXIDE ELECTRODES HAVING HIGH THERMAL STABILITY

BACKGROUND OF THE INVENTION

This invention relates to electrochemical cells and more particularly to silver oxide electrodes.

Conventional methods of making silver oxide cathode material may be divided into two types: electrochemical and chemical. In a typical electrochemical process, a sintered silver plate is anodized in a 31 weight percent KOH solution at room temperature. This method produces a cathode material that is capable of high rates of discharge but which has a very limited shelf life due to thermal instability. Chemically prepared silver oxide is made by the chemical oxidation of silver nitrate with potassium persulfate or ozone in KOH solution at 90° C. The chemically prepared material is more stable than the electrochemically prepared material but has not been used for high-power batteries because of its low electrical conductivity.

It would be desirable to produce silver oxide (AgO) electrodes having both high electrical conductivity and high thermal stability and long shelf life.

SUMMARY OF THE INVENTION

Accordingly an object of this invention is to provide a new method of electrochemically preparing AgO electrodes.

Another object of this invention is to provide a method of increasing the shelf life of electrochemically prepared AgO electrodes.

A further object of this invention is to increase the energy capacity of electrochemically prepared AgO electrodes.

These and other objects of this invention are achieved by proving in the process for preparing AgO cathodes by anodizing silver plaques in basic electrolytes, the improvement of performing the anodizing process at a temperature in the range of from about 70° C. to just under the reflux temperature of the electrolyte.

By combining the elevated temperature with a charge-discharge-charge regime, the AgO content of the electrode is significantly increased.

BRIEF DESCRIPTION OF THE DRAWINGS

A more complete understanding of the invention and many of the attendant advantages thereto will be readily appreciated as the same becomes better understood by reference to the following detailed description when consider in connection with the accompanying drawings wherein.

DETAILED DESCRIPTION OF THE PREFERRED EMBODIMENT

Conventionally, silver oxide (AgO) electrodes are electrochemically (EC) produced by anodizing suitable silver metal structures (e.g., sintered Ag plaques) with an electric current in a basic electrolyte (e.g., 31 percent KOH) at room temperature. The resulting EC silver oxide electrodes are capable of high rates of discharge but have low thermal stabilities and thus limited shelf lifes.

In the present invention, the conventional anodization process is modified by using an anodization temperature of from about 70° C. to just under the reflux temperature of the electrolyte, preferably from 70° C. to 110° C., more preferably from 80° C. to 100° C. and most preferably about 90° C. At these higher temperatures, the formation of the silver oxide electrodes takes significantly more time. However, the thermal stability of the AgO in the electrodes is much greater than conventionally anodized silver oxide electrodes. Moreover, the high discharge rate capability of the electrodes is greater than or equal to conventional EC silver oxide electrodes.

Figure 1:
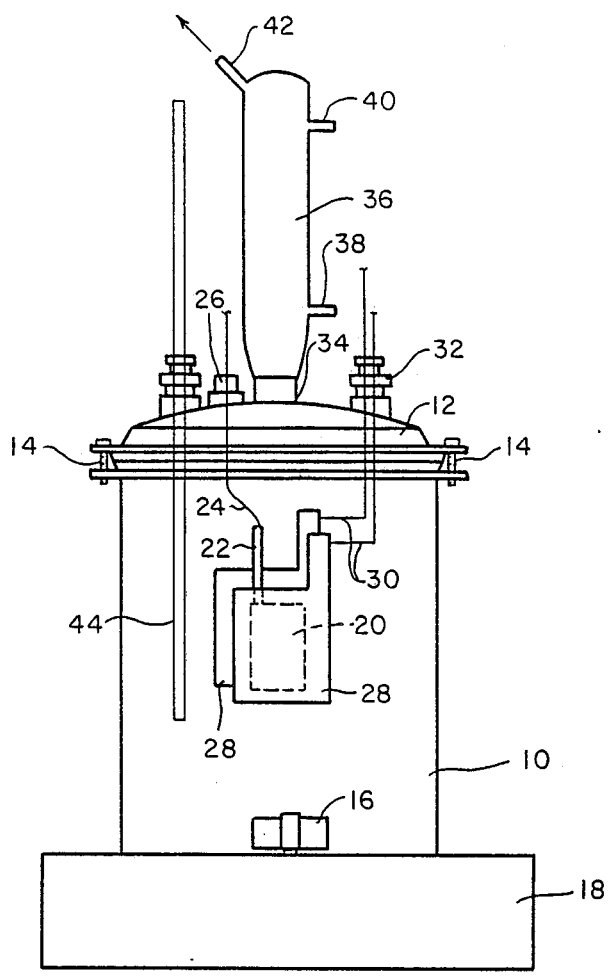
FIG. 1 is a schematic drawing of the apparatus used to demonstrate the present process.
Figure 2:
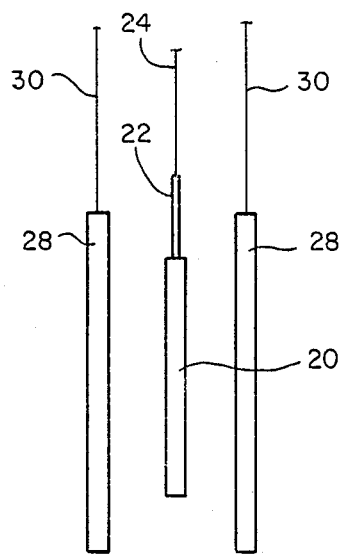
FIG. 2 is a schematic drawing showing the placement of the silver plaque between the nickel counter electrodes in the apparatus of FIG. 1.

FIG. 1 is a schematic drawing of the apparatus used to demonstrate the present process. Shown is the reaction kettle 10 with a cover 12 attached by means of fasteners 14. The reaction kettle 10 rested on a heater/magnetic stirrer 18 and a magnetic stirring bar 16 was placed in the bottom of the kettle 10. The kettle 10 was filled with a standard 31 percent KOH electrolyte. A sample silver plaque 20 functioning as the anode was placed in the electrolyte in the kettle 10 between two nickel counter electrodes 28 which served as the cathode. The silver plaque 20 was connected by a silver tab 22 and a wire 24 to the negative terminal 26 in the cover 12. Similarly, the nickel counter electrodes 28 were connected by wires 30 to a positive terminal 32 in the cover 12. FIG. 2 shows the placement of the silver plaque 20 between the nickel counter electrodes 28 from a different angle. Referring again to FIG. 1, a thermometer 44 is inserted through the cover 12 into the electrolyte in the kettle 10 to monitor the electrolyte temperature. Because the process was run at temperatures as high as 110° C., a vent 34 was provided in the cover 12 to prevent a pressure build up. The vent 34 was fitted with a water cooled condenser 36 to prevent a lose of electrolyte through evaporation. The condenser 34 vented to the atmosphere at the top 42. Cold water was circulated in through port 38 and out through port 40 of the condenser 36. The charging cycle and data acquisition were controlled by a Keithley System 570 DAS connected to a Compaq personal computer.

Table 1 summarizes test conditions and results for the anodization process run at temperatures of from 25° C. to 110° C. In all of the runs listed, the current density on the silver plaque was 4mA/cm$^2$ for both charging and discharging. In all of the runs identical unpressed sintered silver plaques were used. And in all of the runs a standard 31 percent KOH electrolyte was used. For runs up through No. 58 no separator was used. However, colloidal silver in the electrolyte was causing shorts Therefore, for runs No. 59 and above, the silver plaque 20 was heat sealed into a polypropylene separator to protect against the colloidal silver.

In Table 1, column 1 lists the run numbers which are grouped according to the reaction or anodization temperature which is given in column 2. Column 3 gives the AgO decomposition temperatures for the product AgO cathode electrodes Higher AgO decomposition temperatures result in much longer shelf lifes. Columns 4 through 7 list the percent by weight of the $Ag_2CO_3$, AgO, Ag$_2$O, and Ag of the product electrode as determined by thermogravimetry-evolved gas analysis (TGA). The method used is described by W.A. Parkhurst et al. in "Thermogravimetry-Evolved Gas Analysis of Silver Oxide Cathode Material," J. Electrochem. Soc. vol. 131, pp 1739–42, herein incorporated by reference. Column 8 gives the charge discharge regime in hours for each run. A single digit represents a straight charge only. A series of 3 or 5 digits separated by dashes represents charge-discharge regimes. All discharge steps were for 1 hour and all charge steps were for more than one hour.

range. However, the time it takes to form the AgO electrode at a given current density is significantly increased at the higher temperatures of this invention. This is demonstrated by the data presented in Table 2.

TABLE 2

| CHARGING TIME NEEDED TO REACH THE AgO POTENTIAL (MINUTES) | | | |
|---|---|---|---|
| Type Plaque | 25° C. | 70° C. | 90° C. |
| Pressed | — | — | 90 |
| Unpressed | 42 | 79 ± 4 | 89 ± 17 |

1. Current density: 4 mA/cm$^2$

TABLE 1

| Charge No. | Charge Temp (°C.) | AgO Decomp Temp (°C.) | weight % | | | | Charge-[1] Discharge Regime(HRS) |
|---|---|---|---|---|---|---|---|
| | | | 0.1 Ag$_2$CO$_3$ | AgO | Ag$_2$O$_2$ | Ag | C-D-C-D-C |
| 56 | 25 | 212 | 0.44 | 91.82 | 7.88 | 0.00 | 7-1-3-1-3 |
| 64 | 25 | 209 | 3.63 | 76.49 | 19.69 | 0.19 | 7-1-4 |
| 68 | 25 | 204 | 0.88 | 85.01 | 14.03 | 0.08 | 7-1-6 |
| 69 | 25 | 213 | 1.63 | 92.59 | 5.30 | 0.48 | 7 |
| 73 | 25 | 212 | 0.94 | 86.24 | 12.40 | 0.42 | 13 |
| 74 | 25 | 209 | 0.88 | 54.04 | 44.30 | 0.78 | 4.8 (SHORT) |
| 75 | 25 | 212 | 1.07 | 77.11 | 20.68 | 1.14 | 4.8 |
| 76 | 50 | 212 | 0.75 | 81.75 | 17.04 | 0.46 | 7 |
| 77 | 50 | 206 | 1.13 | 51.25 | 44.97 | 2.65 | 7-1-3.5 (TabBroke) |
| 78 | 50 | 204 | 0.67 | 71.65 | 27.66 | 0.00 | 7-1-6 |
| 49 | 70 | 220 | 1.32 | 61.94 | 35.24 | 1.50 | 8 |
| 50 | 70 | 219 | 0.50 | 87.95 | 10.88 | 0.67 | 5-1-2 |
| 51 | 70 | 219 | 1.00 | 65.19 | 32.61 | 1.20 | 7 |
| 67 | 70 | 220 | 0.50 | 95.38 | 3.78 | 0.34 | 7-1-6 |
| 71 | 70 | 219 | 0.63 | 62.71 | 36.55 | 0.11 | 7 |
| 70 | 80 | 220 | 1.38 | 67.04 | 31.43 | 0.15 | 7.8 (bubbles) |
| 42 | 90 | 221 | 0.88 | 65.96 | 34.60 | 0.00 | 5 |
| 48 | 90 | 221 | 0.88 | 86.40 | 13.31 | 0.00 | 9 |
| 53 | 90 | 223 | 1.32 | 93.06 | 5.84 | 0.00 | 7-1-3 |
| 55 | 90 | 223 | 0.50 | 53.57 | 40.57 | 5.36 | 7-1-3-1-3 |
| 59 | 90 | 221 | 3.26 | 85.63 | 10.23 | 0.63 | 7-1-6.5 |
| 60 | 90 | 221 | 1.69 | 94.76 | 2.93 | 0.62 | 7-1-2 |
| 61 | 90 | 221 | 1.57 | 92.44 | 4.91 | 1.08 | 7-1-4 |
| 62 | 90 | 221 | 1.63 | 85.78 | 11.09 | 1.50 | 7 |
| 65 | 90 | 220 | 0.69 | 91.20 | 6.52 | 1.59 | 7-1-6 |
| 66 | 90 | 218 | 0.50 | 95.84 | 3.50 | 0.16 | 7-1-6.5 (dendrite) |
| 72 | 90 | 218 | 0.50 | 75.10 | 24.40 | 0.00 | 7 |
| 52 | 110 | 223 | 0.38 | 88.72 | 10.69 | 0.21 | 6.6 |
| 54 | 110 | 223 | 1.00 | 96.00 | 3.50 | 0.00 | 7-1-5.5 |

[1]All discharge periods are for 1 hour and all charge periods are for more than 1 hour.

Figure 3:
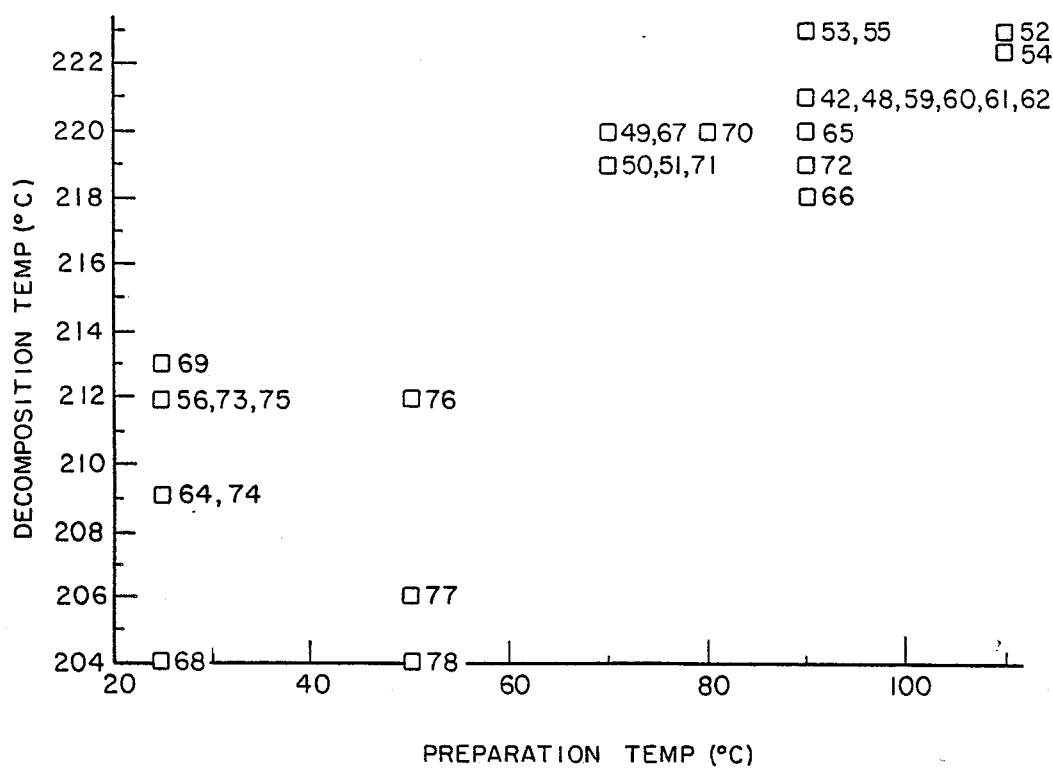
FIG. 3 is a chart showing the relationship between preparation temperatures and AgO decomposition temperatures for AgO electrodes.

The most critical feature of the present invention is the use of an elevated reaction temperature for the anodization of the silver plaque. Comparing columns 2 and 3 of Table 1 shows that AgO decomposition temperature of from 204° C. to 213° C. are achieved for the convention process temperature of 25° C. Even at 50° C. the AgO decomposition temperatures only ranged from 204° C. to 212° C. However, for 70° C. the AgO decomposition range is from 219–220° C., and for 90° C. it is from 218–223° C. For the two electrodes produced at 110° C., the AgO decomposes at 223° C. These results are shown graphically in FIG. 3.

It should be emphasized that the charging equipment, the silver plaque or plate to be treated, and the electrolyte are the same as those used in conventional processes. For example the concentration of the electrolyte may be greater or less than 31 percent and NaOH may be substituted for KOH. Unpressed silver plaques were used in the runs listed in Table 1, but pressed silver plaques have also been treated according to this invention with improved results. Similarly, a wide range of conventional current densities on the silver plaque can be used, with from 2 to 20 mA/cm$^2$ being a preferred At the elevated temperatures of the present process, a significant increase in AgO content (capacity) can be achieved by using a charge-discharge-charge (CDC) regime rather than just a straight charge. Table 3 presents the average AgO percentages for electrode material formed at 25° C., 50° C., 70° C., 90° C., and 110° C. for both the straight charge and the CDC charge. At 25° C. and 50° C. the CDC charge regime offers no improvement over a straight charge. However, at 70° C., 90° C., and 110° C., a significant increase in AgO is produced by the CDC charge regime. The preferred CDC regime is to (1) charge the silver electrode until oxygen is evolved, (2) discharge the electrode at the rate used for charging for 0.5 to 3 hours, and (3) charge the electrode until oxygen is evolved again.

TABLE 3

| EFFECT OF CDC CYCLING ON THE AgO CONTENT OF CATHODES FOR VARIOUS TEMPERATURES | | |
|---|---|---|
| Temp. °C. | Straight[1] Charge | CDC[2] Charge |
| | % AgO | |

TABLE 3-continued

EFFECT OF CDC CYCLING ON THE AgO CONTENT
OF CATHODES FOR VARIOUS TEMPERATURES

| Temp. °C. | Straight[1] Charge | CDC[2] Charge |
|---|---|---|
| 25 | 85.3 + 7.8 | 84.4 ± 7.7 |
| 50 | 81.75 | 71.65 |
| 70 | 63.3 ± 1.7 | 91.7 ± 5.3 |
| 90 | 78.3 ± 9.7 | 92.2 ± 3.6 |
| 110 | 88.7 | 96.0 |

[1]AgO percentage obtained by averaging all AgO weight percentages given in Table 1 for straight charges at each reaction temperature.
[2]AgO percentage obtained by averaging all AgO weight percentages given in Table 1 for charge-discharge-charge (CDC) regimes at each reaction temperature. The value for 25° C. includes run 56 (CDCDC) which produced 91.82% AgO.

The presence of transition metal ions in the silver oxide active material has been found to significantly reduce the stability and shelf life of silver oxide electrodes whether chemically or electrochemically produced. Copper ions are quite soluble in the electrolyte and are incorporated as copper oxide into the silver oxide structure. The other transition metal ions are insoluble in the KOH electrolyte and cannot become incorporated into AgO through the electrochemical charging process. Care should be taken to avoid common copper ion sources in the charging cells such as copper wires or buses and conventional silver solders which contain about 15% copper. Table 4 presents data which illustrates the deleterious effect of the presence of copper ions on the shelf life of the AgO electrodes.

TABLE 4

CATHODES WITH AND WITHOUT TRANSITION METAL INCORPORATION AA Analysis[1]

| Sample | Solder | Metal | Cu | Ni | Fe | Co | $t_{0.10}(yr)$[2] |
|---|---|---|---|---|---|---|---|
| raw material | no | none | 4 | 10 | 27 | 1 | — |
| baseline | no | none | 8 | 19 | 17 | 1 | 60 |
| 1 | yes | none | 208 | 8 | 21 | 1 | 6 |
| 2 | yes | Fe | 221 | 12 | 47 | 1 | 6 |
| 3 | yes | Co | 248 | 10 | 25 | 1 | 6 |
| 4 | yes | Ni | 194 | 7 | 22 | 1 | 6 |
| 5 | yes | Cu | 1890 | 9 | 26 | 1 | 2 |

[1]Transition metals in parts million of the electrode material
[2]$t_{0.10}$ - time in years required for 10% of the AgO to decompose.

Obviously, numerous modifications and variations of the present invention are possible in light of the above teachings. It is therefore to be understood that within the scope of the appended claims the invention may be practiced otherwise than as specifically described herein.

What is claimed is:

1. In the process for preparing AgO cathodes by anodizing silver plaques in basic electrolytes, the improvement comprising:
   performing the anodizing process at a temperature in the range of from about 70° C. to just under the reflux temperature of the electrolyte.
2. The process of claim 1 wherein the anodizing temperatures is in the range of from 70° C. to 110° C.
3. The process of claim 2 wherein the anodizing temperature is from 80° C. to 100° C.
4. The process of claim 3 wherein the anodizing temperature is about 90° C.
5. The process of claim 1 wherein a charge-discharge-charge regime is used to form the AgO electrode.
6. The process of claim 5 wherein the charge-discharge-charge regime comprises changing until oxygen is evolved, then discharging at the same rate for 0.5 to 3 hours and then charging again until oxygen is evolved.
7. The process of claim 6 wherein the charge-discharge-charge regime comprises charging until oxygen is evolved, discharging at the same rate for about 1 hour, and then charging until oxygen is evolved.

* * * * *